(12) United States Patent
Tsumura et al.

(10) Patent No.: US 7,855,760 B2
(45) Date of Patent: Dec. 21, 2010

(54) LIQUID CRYSTAL DISPLAY APPARATUS

(75) Inventors: Makoto Tsumura, Hitachi (JP);
Akitoyo Konno, Hitachi (JP); Yoshifumi Sekiguchi, Hitachiota (JP); Ikuo Hiyama, Hitachinaka (JP); Daisuke Kajita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 12/191,380

(22) Filed: Aug. 14, 2008

(65) Prior Publication Data
US 2009/0066874 A1   Mar. 12, 2009

(30) Foreign Application Priority Data
Sep. 7, 2007   (JP) .............................. 2007-232933

(51) Int. Cl.
*G02F 1/1333*   (2006.01)
(52) U.S. Cl. .......................................... 349/58; 349/64
(58) Field of Classification Search .................. None
See application file for complete search history.

(56) References Cited

U.S. PATENT DOCUMENTS

2002/0044437 A1* 4/2002 Lee .............................. 362/31
2005/0162868 A1* 7/2005 Kim ............................ 362/632
2007/0195223 A1    8/2007 Nishiyama et al.

FOREIGN PATENT DOCUMENTS

| JP | 6-75217 A | * | 3/1994 |
| JP | 2004-12728 A | * | 1/2004 |
| JP | 2004-186080 |  | 7/2004 |
| JP | 2004-233828 |  | 8/2004 |
| JP | 2004-233828 A | * | 8/2004 |
| JP | 2005-347062 |  | 12/2005 |
| JP | 2006-208466 A | * | 8/2006 |
| JP | 2007-225781 |  | 9/2007 |

* cited by examiner

*Primary Examiner*—Mike Stahl
(74) *Attorney, Agent, or Firm*—Antonelli, Terry, Stout & Kraus, LLP.

(57) ABSTRACT

In a liquid crystal apparatus in which a white light of a fluorescent tube corresponding to a linear light source repeats plural times of diffusions and reflections between a reflection sheet and a diffusion plate, and is thereafter input as a back light to a liquid crystal panel corresponding to a display screen, an object of the invention is to make it possible to secure a brightness uniformity even if the liquid crystal apparatus is thinned. It is possible to prevent a brightness unevenness caused by a short distance from the reflection sheet to the diffusion plate, by preventing a deformation (a deformation which is convex toward the fluorescent tube) of the diffusion plate due to a thermal expansion of the diffusion plate caused by a heat generation of the fluorescent tube, by arranging at least one pin mold hold so as to support a portion near an approximately center of the diffusion plate.

7 Claims, 7 Drawing Sheets

LIQUID CRYSTAL DISPLAY APPARATUS

BACKGROUND OF THE INVENTION (1) Field of the Invention

The present invention relates to a thinning of a liquid crystal display apparatus.

(2) Description of Related Art

As a liquid crystal display apparatus in accordance with a prior art, there is disclosed a liquid crystal display apparatus having a liquid crystal panel PNL displaying an image, and a lighting apparatus BL arranged in a back surface of the liquid crystal panel PNL and emitting a white light to the liquid crystal panel PNL, and structured such that the lighting apparatus BL has a fluorescent tube CFL, a reflection member arranged in a back surface of the fluorescent tube CFL and reflecting in a diffusion manner the white light from the fluorescent tube CFL, and a diffusion plate DEP arranged in a front surface of the fluorescent tube CFL and transmitting the white light from the fluorescent tube CFL in a diffusion manner, as described in patent document 1 (JP-A-2005-347062).

In the conventional liquid crystal display apparatus mentioned above, since the diffusion plate is thermally expanded by a heat generation of the fluorescent tube, the thermal expansion of the surface which is close to the fluorescent tube becomes greater than the thermal expansion of the surface which is far from the fluorescent tube, and the diffusion plate is deformed convex toward the fluorescent tube side. If the diffusion plate is deformed convex toward the fluorescent tube side, the diffusion distance becomes smaller than the minimum diffusion distance in the case that the height from the reflection member to the fluorescent tube is aligned with the minimum diffusion distance capable of suppressing a brightness unevenness. Accordingly, there is generated a problem that the light generation portion of the fluorescent tube is viewed as the brightness unevenness. Particularly, since a sensitivity about a uniformity of the emitted light becomes higher with respect to the dispersion of the diffusion distance in accordance that the height becomes small by being aligned with the minimum diffusion distance, the uniformity of the emitted light from the fluorescent tube can not be secured only by a little convex deformation of the diffusion plate toward the fluorescent tube side, so that there is generated a problem that the light generation portion of the fluorescent tube is viewed as the brightness unevenness.

For example, in the case that the diffusion distance about 20 mm is made equal to or less than 10 mm because the minimum diffusion distance is equal to or less than 10 mm, the diffusion plate is deformed convex to the fluorescent tube side, and the uniformity of the emitted light from the fluorescent tube can not be secured, only by generation of a strain equal to or less than 1 mm, so that there is generated a problem that the light generation portion of the fluorescent tube is viewed as the brightness unevenness.

BRIEF SUMMARY OF THE INVENTION

Accordingly, an object of the present invention is to provide a liquid crystal display apparatus which can display a good image suppressing a brightness unevenness, even if a lighting apparatus is thinned.

In accordance with the present invention, there is provided a liquid crystal display apparatus including a liquid crystal panel displaying an image, a lighting apparatus arranged in a back face of the liquid crystal panel and emitting a light (a white light) to the liquid crystal panel, the lighting apparatus having at least one linear light source (a fluorescent tube), a reflection member (a reflection sheet) reflecting the light (the white light) from the linear light source in a diffusion manner, and a diffusion transmitting member (a diffusion plate) transmitting the light (the white light) from the linear light source in a diffusion manner, and a plurality of first support members (an outer frame of a lower frame and an upper side mold) fixed in the vicinity of both end portions of the reflection member and supporting the diffusion transmitting member, wherein at least one second support member (a pin mold) is fixed to the reflection member in such a manner as to support a portion near a center of the diffusion transmitting member.

As a result, since the portion near the center of the diffusion transmitting member at which the diffusion transmitting member (the diffusion plate) is deformed most by a thermal strain is supported by the second support member (the pin mold), thereby maintaining the diffusion distance near the center of the diffusion transmitting member at the height of the second support member, it is possible to inhibit the diffusion plate from being deformed in a direction in which the diffusion distance is shortened.

In the liquid crystal display apparatus in accordance with the present invention, it is preferable that a third support member is provided so as to approximately equally divide between the first support member and the second support member and support a position on the diffusion transmitting member, and is fixed to the reflection member.

Further, in accordance with the present invention, there is provided a liquid crystal display apparatus including a liquid crystal panel displaying an image, a lighting apparatus arranged in a back face of the liquid crystal panel and emitting a light to the liquid crystal panel, the lighting apparatus having at least one linear light source, a reflection member reflecting the light from the linear light source in a diffusion manner, and a diffusion transmitting member transmitting the light from the linear light source in a diffusion manner, a plurality of first support members fixed in the vicinity of both end portions of the reflection member and supporting the diffusion transmitting member, and a liquid crystal panel insertion member having a groove to which the liquid crystal panel is inserted in an inner side, wherein a slope or a step is provided in a contact surface with the diffusion transmitting member in the first support member, in such a manner that a height from the reflection member to the diffusion transmitting member becomes equal to or higher than a height in an end portion, near the center of the diffusion transmitting member, and a pressing member is provided such that one end is fixed to a portion near the end portion of the diffusion transmitting member, and the other end is fixed to a portion near the end portion of the liquid crystal panel insertion member.

Further, in the liquid crystal display apparatus in accordance with the present invention, it is preferable that a second support member having a height which is somewhat larger than the first support member is fixed to the reflection member, in such a manner as to support the portion near the center of the diffusion transmitting member.

Further, in the liquid crystal display apparatus in accordance with the present invention, it is preferable that a difference of height between the first support member and the second support member is between 0.1 and 1.0 mm.

Further, in the liquid crystal display apparatus in accordance with the present invention, it is preferable that the diffusion plate is constituted by a diffusion plate with a prism shape.

Further, in the liquid crystal display apparatus in accordance with the present invention, it is preferable that a distance between the linear light source and the diffusion transmitting member is equal to or less than threefold a diameter of the linear light source.

In accordance with the present invention, there can be provided the liquid crystal display apparatus which can display a good image even if the liquid crystal display apparatus is thinned.

Other objects, features and advantages of the invention will become apparent from the following description of the embodiments of the invention taken in conjunction with the accompanying drawings.

DETAILED DESCRIPTION OF THE INVENTION

A description will be given below of a liquid crystal display apparatus in accordance with first to fourth embodiments of the present invention.

Liquid Crystal Display Apparatus of First Embodiment

Figure 1:
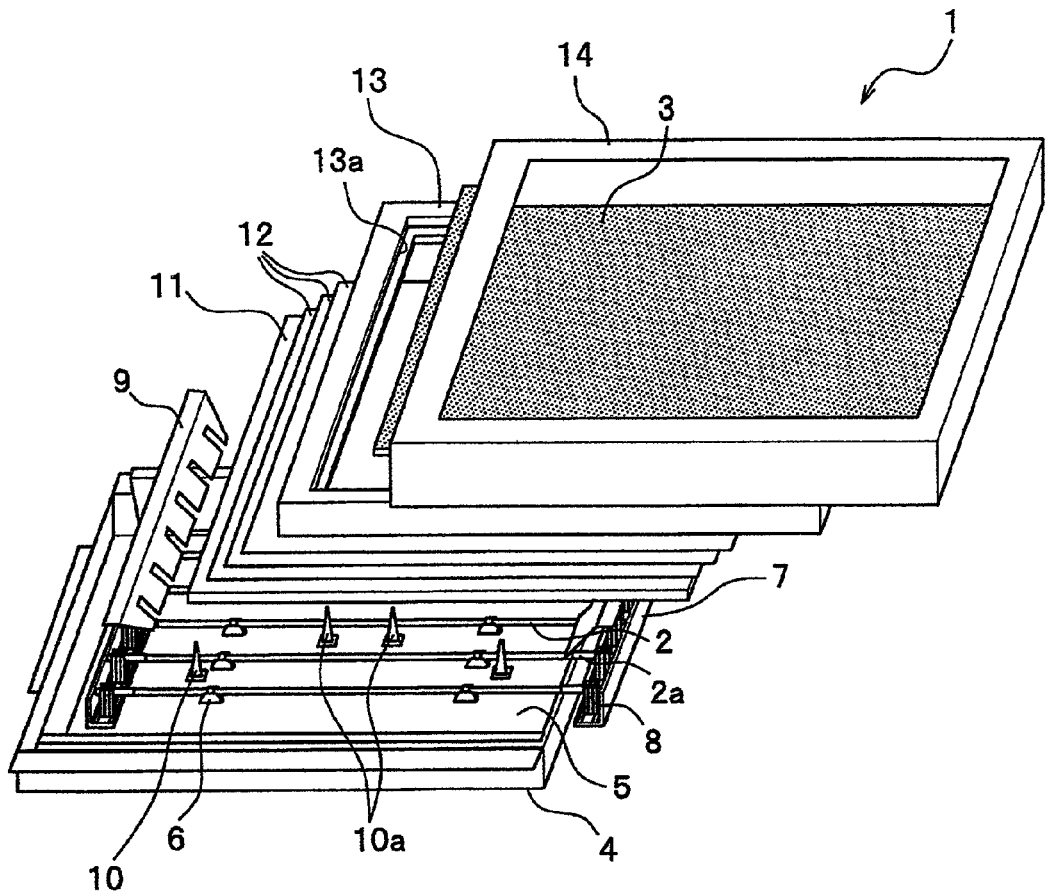
FIG. 1 is an exploded view showing a structure of a liquid crystal display apparatus in accordance with a first embodiment of the present invention.
Figure 2:
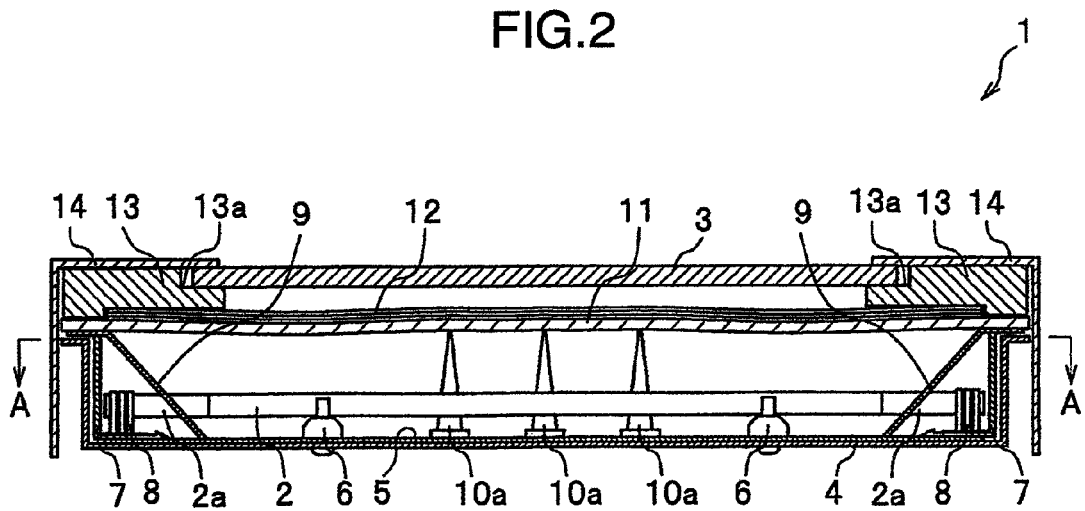
FIG. 2 is a cross sectional view showing the structure of the liquid crystal display apparatus in accordance with the first embodiment of the present invention.
Figure 3:
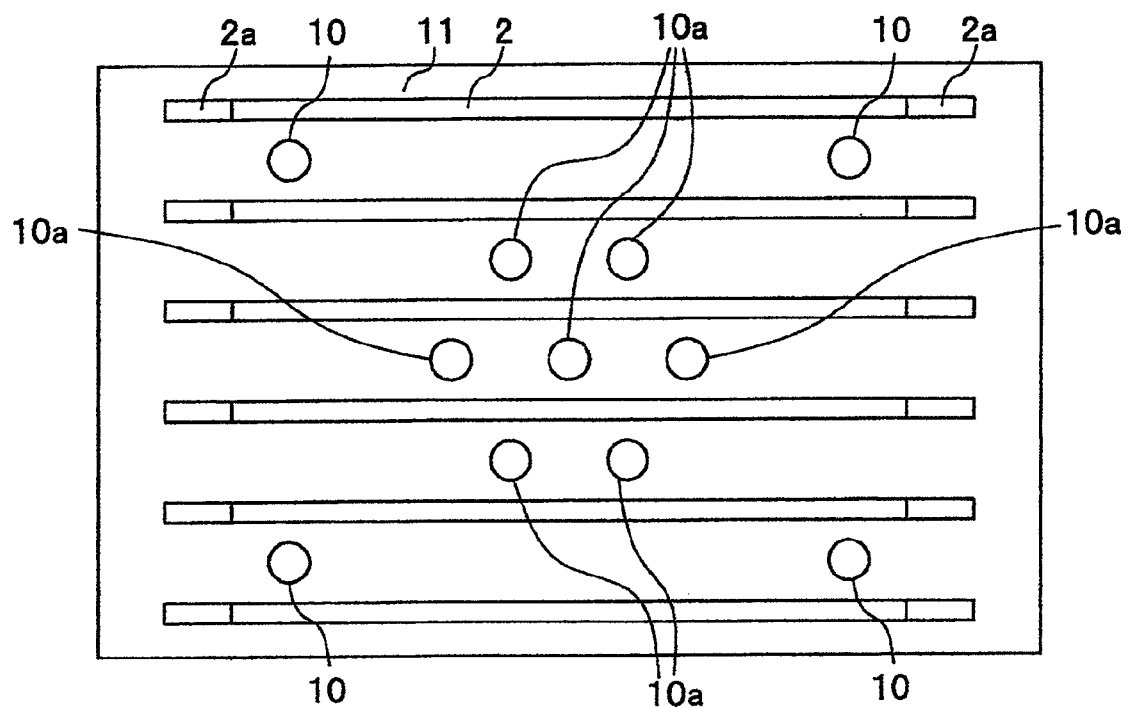
FIG. 3 is a back elevational view (a cross sectional view along a line A-A) showing the structure of the liquid crystal display apparatus in accordance with the first embodiment of the present invention.

First of all, a description will be given of a liquid crystal display apparatus in accordance with the first embodiment of the present invention with reference to FIGS. 1 to 3. FIG. 1 is an exploded view showing a structure of the liquid crystal display apparatus in accordance with the first embodiment of the present invention, FIG. 2 is a cross sectional view showing the structure of the liquid crystal display apparatus in accordance with the first embodiment of the present invention, and FIG. 3 is a back elevational view (a cross sectional view along a line A-A) showing the structure of the liquid crystal display apparatus in accordance with the first embodiment of the present invention. Hereinafter, the liquid crystal display apparatus in accordance with the first embodiment will be called as a liquid crystal display apparatus 1 in accordance with the present embodiment, and will be explained.

First of all, a description will be given of the structure of the liquid crystal display apparatus 1 in accordance with the present embodiment. In this case, the liquid crystal display apparatus 1 in accordance with the present embodiment is characterized in that pin molds 10 are arranged in a reflection sheet 5 in such a manner as to support a portion near a center of a diffusion plate 11 by seven pin molds 10a in eleven pin molds 10, as shown in FIG. 3. In this case, the number of the pin molds 10a supporting the portion near the center may be set to six or lower, or eight or more.

The liquid crystal display apparatus 1 in accordance with the present embodiment has six fluorescent tubes 2 constituted by a linear light source and irradiating a uniform white light, and a liquid crystal panel 3 on which an image is displayed, and the white light from each of the fluorescent tube 2 is emitted as a back light to the liquid crystal panel 3. In this case, in the liquid crystal display apparatus 1 in accordance with the present embodiment, the number of the fluorescent tube 2 is six, however, may be set to five or less, or seven or more.

The fluorescent tube 2 is fixed to a position having a predetermined height from the reflection sheet 5 by being retained by a tube holder 6 fixed to the reflection sheet 5 attached to a lower frame 4. Further, a lower side mold 7 is fixed to the reflection sheet 5, and an electrode holder 8 retaining electrodes 2a existing in both ends of the fluorescent tube 2 is fixed to the lower side mold 7. Further, a diffusion plate 11 is fixed to a position having a predetermined height from the reflection sheet 5 by an upper side mold 9 provided in such a manner as to cover the lower side mold 7, and eleven pin molds 10 fixed to the reflection sheet 5.

Seven pin molds 10a among eleven pin molds 10 are fixed to the reflection sheet 5 in such a manner as to support a center of the diffusion plate 11. Further, three optical sheets 12 are attached to the diffusion plate 11. In this case, the number of the optical sheets 12 may be set to two or less, or four or more. Further, the diffusion plate 11 is fixed while being sandwiched between the upper side mold 9 and an intermediate frame 13.

The liquid crystal panel 3 is fitted to a groove 13a of the intermediate frame 13 and is thereafter fixed to the intermediate frame 13 by an adhesive agent or the like. Further, an upper frame 14 is fixed to the intermediate frame 13 to which the liquid crystal panel 3 is fixed, by an adhesive agent or the like.

Next, a description will be given of a motion of the liquid crystal display apparatus 1 in accordance with the present embodiment.

Since the reflection sheet 5 efficiently reflects in a diffusion manner the white light from the fluorescent tube 2 upward, and the diffusion plate 11 transmits the white light from the fluorescent tube 2 while diffusing, the white light emitted from the fluorescent tube 2 is emitted while repeating plural times of diffusions and reflections between the reflection sheet 5 and the diffusion plate 11 so as to enter into the liquid crystal panel 3. In this case, after emitting while repeating the plural times of diffusions and reflections between the reflection sheet 5 and the diffusion plate 11, the white light is controlled in a diffusion characteristic and a directivity by three optical sheets 12 attached to a top surface of the diffusion plate 11.

Next, a description will be given of a suppression of a brightness unevenness in the liquid crystal display apparatus 1 in accordance with the present embodiment. Hereinafter, a distance from the reflection sheet 5 to the diffusion plate 11 is called as a diffusion distance. Further, as mentioned above, since the fluorescent tube 2 is fixed to the position having the predetermined height from the reflection sheet 5, a distance between the fluorescent tube 2 and the diffusion plate 11 is constant, and this distance is called as an on-tube distance.

A minimum diffusion distance capable of suppressing the brightness unevenness is decided on the basis of a diffusion performance of the diffusion plate 11 and the optical sheet 12, and if the diffusion distance is equal to or more than the minimum diffusion distance, it is possible to suppress the brightness unevenness. Accordingly, it is necessary to keep the diffusion distance at the minimum diffusion distance at a time of thinning the liquid crystal display apparatus. Then, the liquid crystal display apparatus 1 is thinned by thinning a lighting apparatus constituted by the fluorescent tube 2, the reflection sheet 5, the diffusion plate 11, three optical sheets 12 and the like, by aligning the height of the pin mold 10 with the minimum diffusion distance. Further, in the liquid crystal display apparatus 1 in accordance with the present embodiment, the pin molds 10 are arranged in the reflection sheet 5, in such a manner as to support the portion near the center of the diffusion plate 11 by seven pin molds 10a among eleven pin molds 10.

When the fluorescent tube 2 generates light by supporting the portion near the center of the diffusion plate 11 by the pin mold 10a, the diffusion plate 11 generates a thermal expansion and the diffusion plate 11 is deformed convex toward the fluorescent tube 2 side, thereby preventing the diffusion distance near the center of the diffusion plate 11 from becoming smaller than the minimum diffusion distance. As a result, since it is possible to maintain at least the portion near the center of the display screen (the liquid crystal panel 3) having the highest sensitivity with respect to the brightness unevenness at the minimum diffusion distance, the liquid crystal display apparatus 1 in accordance with the present embodiment can provide a good image in which the brightness unevenness is suppressed.

Figure 4:
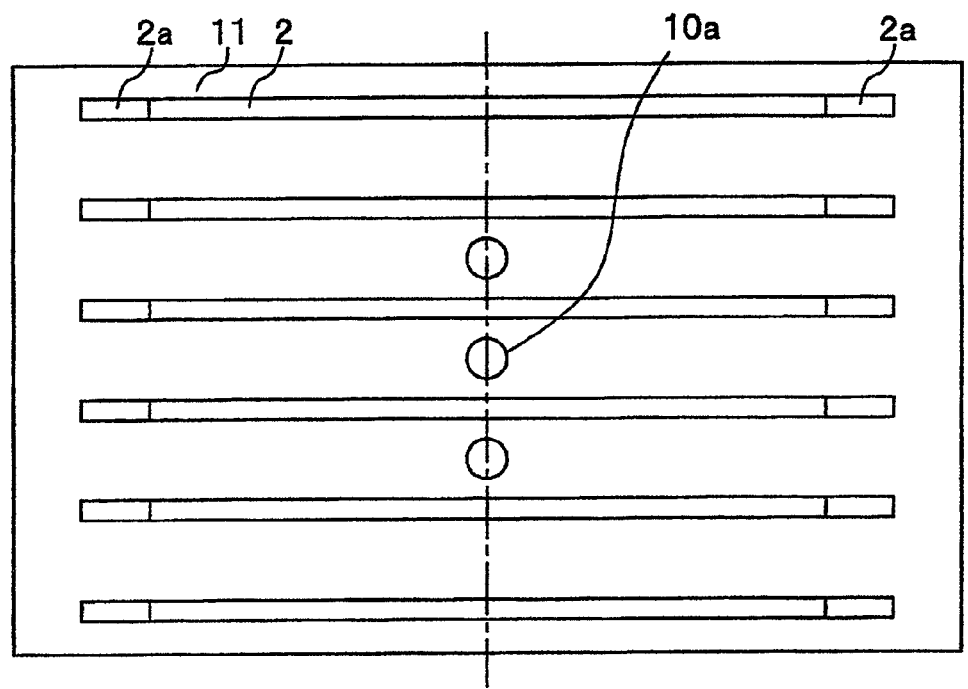
FIG. 4 is a back elevational view of a liquid crystal display apparatus in which pin molds are arranged on display in such a manner as to support a plurality of points near a center of a diffusion plate and on a center line of a short direction.

In this case, in the liquid crystal display apparatus 1 in accordance with the present embodiment, the description is given of the case of supporting the portion near the center of the diffusion plate 11 by seven pin molds 10a among eleven pin molds 10, however, the structure is not limited to this. Of course, even in a liquid crystal display apparatus in which the number of the pin molds 10a supporting the portion near the center of the diffusion plate 11 is equal to or less than six or equal to or more than eight, since the portion near the center of the diffusion plate 11 is supported, it is possible to provide a good image in which the brightness unevenness is suppressed. Further, even in a liquid crystal display apparatus in which the pin molds 10a are arranged in such a manner as to support a plurality of points near the center of the diffusion plate 11 and on a center line in a short direction, as shown in FIG. 4, it is possible to provide a good image in which the brightness unevenness is suppressed. In this case, FIG. 4 is a back elevational view of a liquid crystal display apparatus in which the pin molds 10a are arranged on display in such a manner as to support a plurality of points near the center of the diffusion plate 11 and on the center line in the short direction.

Liquid Crystal Display Apparatus of Second Embodiment

Figure 5:
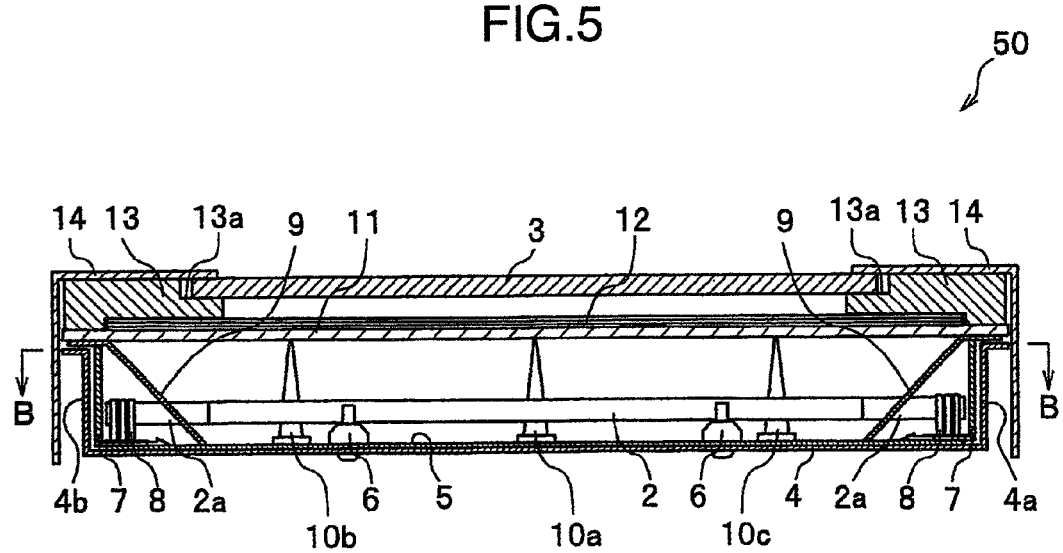
FIG. 5 is a cross sectional view showing a structure of a liquid crystal display apparatus in accordance with a second embodiment of the present invention.
Figure 6:
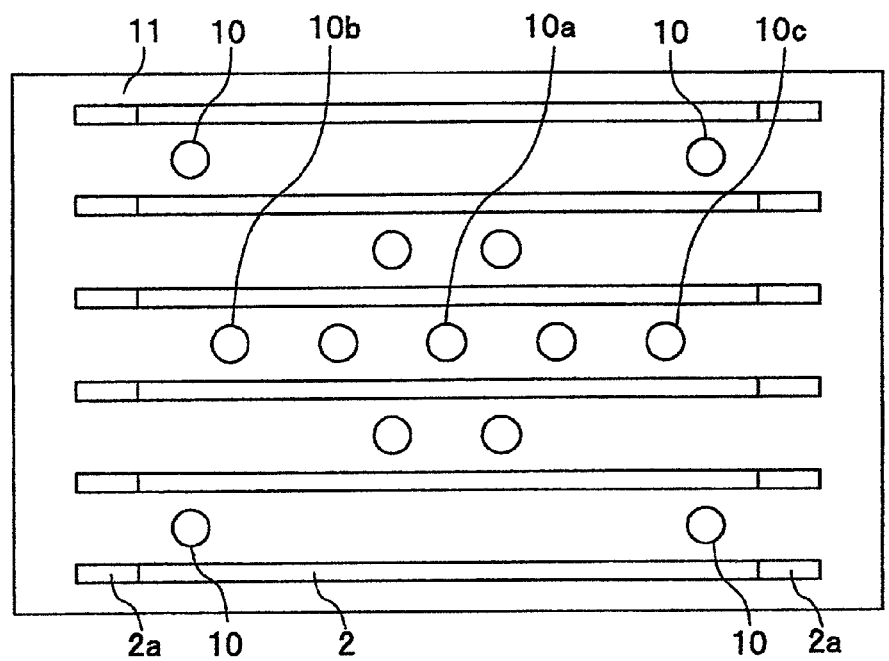
FIG. 6 is a back elevational view (a cross sectional view along a line B-B) showing the structure of the liquid crystal display apparatus in accordance with the second embodiment of the present invention.

Next, a description will be given of a liquid crystal display apparatus in accordance with a second embodiment of the present invention with reference to FIGS. 5 and 6. FIG. 5 is a cross sectional view showing a structure of the liquid crystal display apparatus in accordance with the second embodiment of the present invention, and FIG. 6 is a back elevational view (a cross sectional view along a line B-B) showing the structure of the liquid crystal display apparatus in accordance with the second embodiment of the present invention. Hereinafter, the liquid crystal display apparatus in accordance with the second embodiment is called as a liquid crystal display apparatus 50 in accordance with the present embodiment.

First of all, a description will be given of a structure of the liquid crystal display apparatus 50 in accordance with the present embodiment. In this case, the liquid crystal display apparatus 50 in accordance with the present embodiment is characterized in that the pin molds 10 are arranged in the reflection sheet 5 in such a manner as to support positions which equally divide between the pin mold 10a and positions of an outer frame 4b and an outer frame 4a, respectively by new pin mold 10b and pin mold 10c, as well as supporting the portion near the center of the diffusion plate 11 by the pin mold 10a, as shown in FIG. 6.

The liquid crystal display apparatus 50 in accordance with the present embodiment is structured such that the liquid crystal display apparatus 1 in accordance with the first embodiment mentioned above is provided with the new pin mold 10b and pin mold 10c, specifically structured such that the new pin mold 10b and pin mold 10c are provided at the positions equally dividing between the arranged position of the pin mold 10a supporting the portion near the center of the diffusion plate 11, and the positions of the outer frame 4b and the outer frame 4a of the lower frame 4, respectively. Since it is possible to maintain the diffusion distance at the dimension of the pin mold 10, that is, the minimum diffusion distance, all over the diffusion plate 11, by providing the new pin mold 10b and pin mold 10c, it is possible to provide a good image in which the brightness unevenness is suppressed, all over the display screen (the liquid crystal panel 3) of the liquid crystal display apparatus 50.

Further, since it is possible to suppress a fluctuation of the diffusion distance to the minimum even in the case that the number of the pin mold 10 is increased in comparison with the liquid crystal display apparatus 1 in accordance with the first embodiment mentioned above, whereby an unexpected mechanical stress strain is generated due to an application of an external force or the like, it is possible to maintain an extremely good display quality.

In this case, in the liquid crystal display apparatus 50 in accordance with the present embodiment, the description is given of the case having the pin mold 10 in addition to the pin mold 10a supporting the portion near the center of the diffusion plate 11, and the pin mold 10b and the pin mold 10c which are arranged at the positions equally dividing between the arranged position of the pin mold 10a, and the positions of the outer frame 4b and the outer frame 4a of the lower frame 4, respectively, however, the structure is not limited to this. Even in the case that only the pin mold 10a, the pin mold 10b and the pin mold 10c are provided, it is possible to provide a good image having no brightness unevenness all over the display screen (the liquid crystal panel 3) of the liquid crystal display apparatus.

Figure 7:
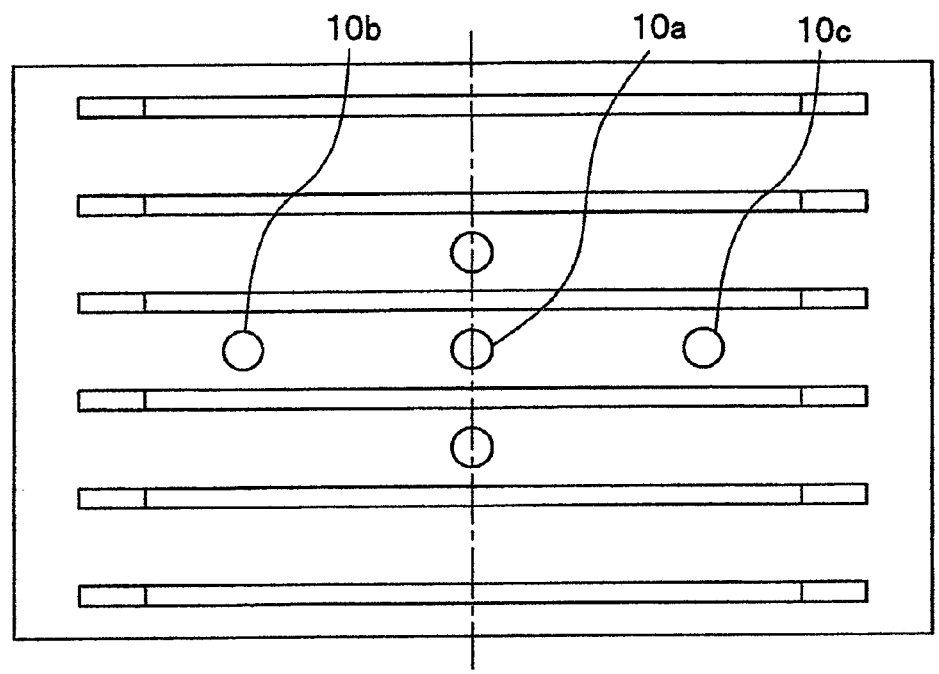
FIG. 7 is a back elevational view of a liquid crystal display apparatus in which pin molds are arranged on display in such a manner as to support a plurality of points near a center of a diffusion plate and on a center line of a short direction.

Further, in the case that the pin molds 10a are arrange on display in such a manner as to support a plurality of points near the center of the diffusion plate 11 and on the center line in the short direction, in addition to the pin mold 10a, the pin mold 10b and the pin mold 10c mentioned above, as shown in FIG. 7, it is possible to provide a good image having no brightness unevenness all over the display screen (the liquid crystal panel 3) of the liquid crystal display apparatus. In this case, FIG. 7 is a back elevational view of the liquid crystal display apparatus in which the pin molds 10a are arranged on display in such a manner as to support a plurality of points near the center of the diffusion plate 11 and on the center line in the short direction in addition to the pin mold 10a, the pin mold 10b and the pin mold 10c mentioned above.

Liquid Crystal Display Apparatus of Third Embodiment

Figure 8:
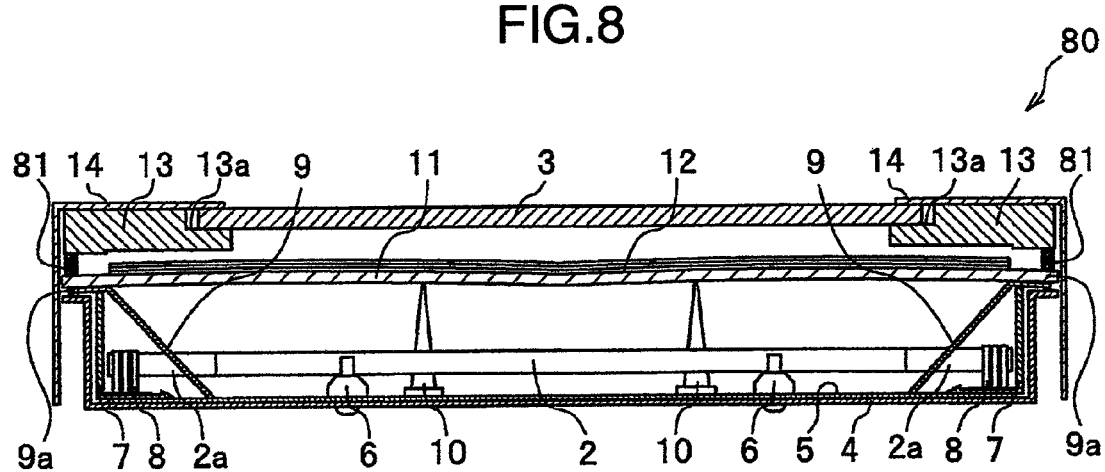
FIG. 8 is a cross sectional view showing a structure of a liquid crystal display apparatus in accordance with a third embodiment of the present invention.
Figure 9:
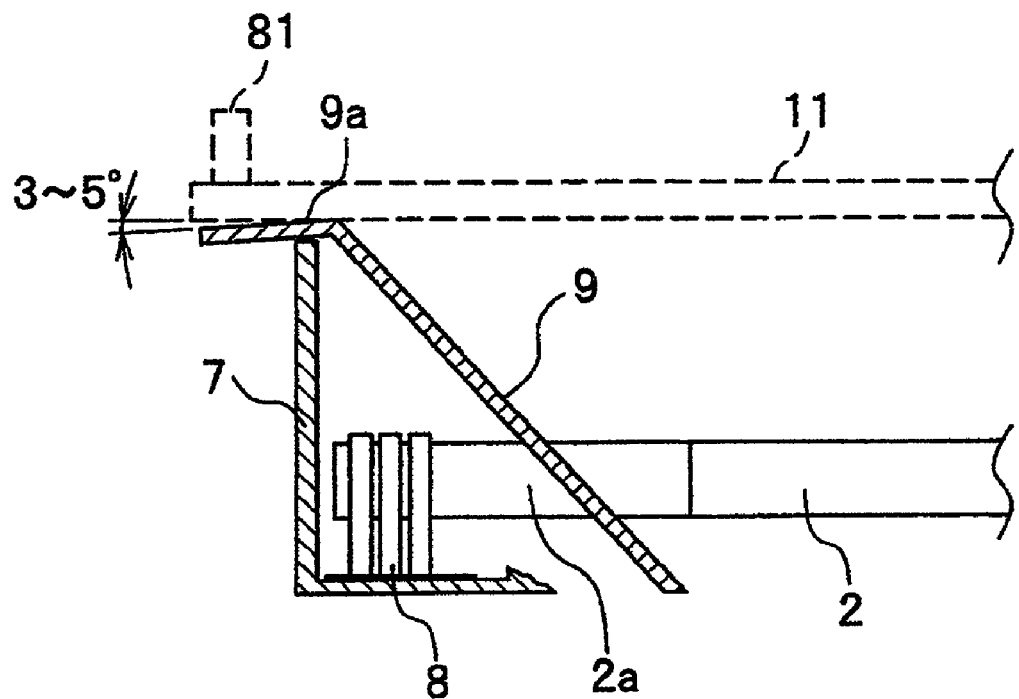
FIG. 9 is a view showing a shape of an upper side mold in the liquid crystal display apparatus in accordance with the third embodiment of the present invention.

A description will be given below of a liquid crystal display apparatus in accordance with a third embodiment of the present invention with reference to FIGS. 8 and 9. FIG. 8 is a cross sectional view showing a structure of the liquid crystal display apparatus in accordance with the third embodiment of the present invention, and FIG. 9 is a view showing a shape of an upper side mold 9 in the liquid crystal display apparatus in accordance with the third embodiment of the present invention. Hereinafter, the liquid crystal display apparatus in accordance with the third embodiment is called as a liquid crystal display apparatus 80 in accordance with the present embodiment.

First, a description will be given of the structure of the liquid crystal display apparatus 80 in accordance with the present embodiment. The liquid crystal display apparatus 80 in accordance with the present embodiment is in common with the liquid crystal display apparatus 1 in accordance with the first embodiment in the following points (1) to (7) mentioned below.

(1) The liquid crystal display apparatus has the fluorescent tube 2 irradiating the uniform white light, and the liquid crystal panel 3 on which the image is displayed, and the white light from the fluorescent tube 2 is emitted as the back light to the liquid crystal panel 3.

(2) The fluorescent tube 2 is retained by the tube holder 6 fixed to the reflection sheet 5 attached to the lower frame 4, thereby being fixed at the position having the predetermined height from the reflection sheet 5.

(3) The lower side mold 7 is fixed to the lower frame 4, and the electrode holder 8 retaining the electrodes 2a existing at both ends of the fluorescent tube 2 is fixed to the lower side mold 7.

(4) The diffusion plate 11 is fixed to the position having the predetermined height from the reflection sheet 5 by the upper side mold 9 provided in such a manner as to cover the lower side mold 7, and a plurality of pin molds 10 fixed to the reflection sheet 5 and having the height of the minimum diffusion distance.

(5) Three optical sheets 12 are attached to the diffusion plate 11.

(6) The diffusion plate 11 is sandwiched between the upper side mold 9 and the intermediate frame 13.

(7) The upper frame 14 is fixed to the intermediate frame 13 to which the liquid crystal panel 3 is fixed.

In addition to the items (1) to (7) mentioned above, the liquid crystal display apparatus 80 in accordance with the present embodiment is structured such that a contact surface 9a of the upper side mold 9 with the diffusion plate 11 is inclined at 3 to 5 degree (inclined so as to come down toward an end), one end of a diffusion plate pressing member 81 is fixed to the portion near the end portion of the diffusion plate 11, and the other end thereof is fixed to the portion near the end portion of the intermediate frame 13, as shown in FIG. 9, in such a manner as to make the distance (the height) from the reflection sheet 5 to the diffusion plate 11. In accordance with this structure, since the diffusion plate pressing member 81 presses the end portion of the diffusion plate 11 even if the diffusion plate 11 is heated on the basis of the light generation of the fluorescent portion 2, it is possible to prevent the diffusion plate 11 from being thermally deformed so as to be deformed convexly to the fluorescent tube 2 side. Particularly, it is possible to maintain the diffusion distance near the center of the lower frame 4 equal to or more than the minimum diffusion distance.

As a result, since it is possible to maintain at least the portion near the center of the display screen (the liquid crystal panel 3) having the highest sensitivity of the viewer with respect to the brightness unevenness at the minimum diffusion distance, the liquid crystal display apparatus 80 in accordance with the present embodiment can provide a good image in which the brightness unevenness is suppressed.

Figure 10:
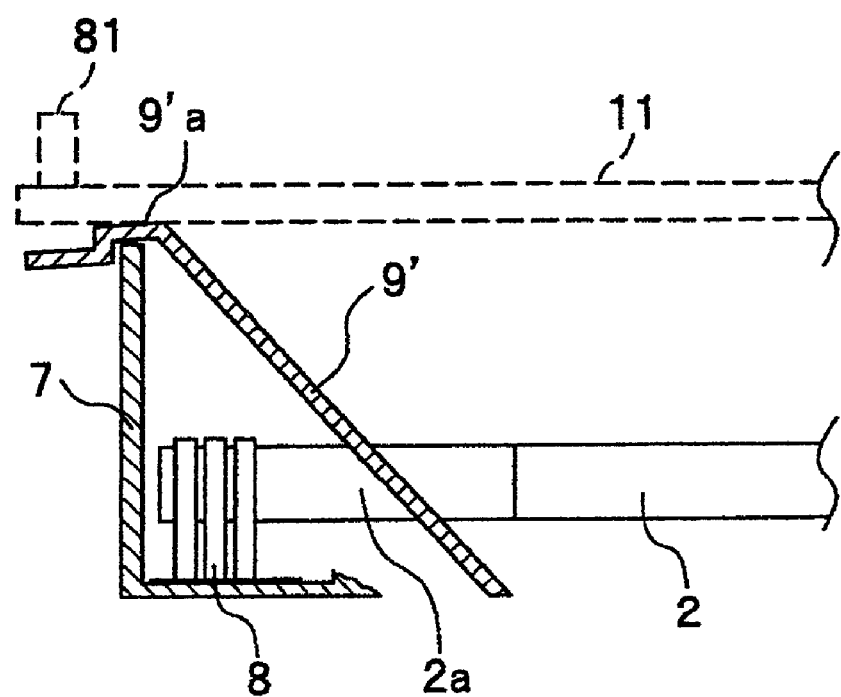
FIG. 10 is a view showing a shape of an upper side mold in which a step exists in a contact surface with a diffusion plate.

In this case, in the liquid crystal display apparatus 80 in accordance with the present embodiment, the description is given of the case that the contact surface 9a of the upper side mold 9 with the diffusion plate 11 is inclined, however, the structure is not limited to this. For example, as shown in FIG. 10, the good image having the suppressed brightness unevenness can be provided in the same manner by pressing the portion near the end portion of the diffusion plate 11 by the pressing member 81 as well as forming a step in a contact surface 9'a of an upper side mold 9' with the diffusion plate 11. FIG. 10 is a view showing a shape of the upper side mold having the step in the contact surface with the diffusion plate. In this case, the contact surface 9'a of the upper side mold 9' described in FIG. 10 is inclined so as to come down toward the end, however, may be structured such as not to be inclined.

Liquid Crystal Display Apparatus of Fourth Embodiment

Figure 11:
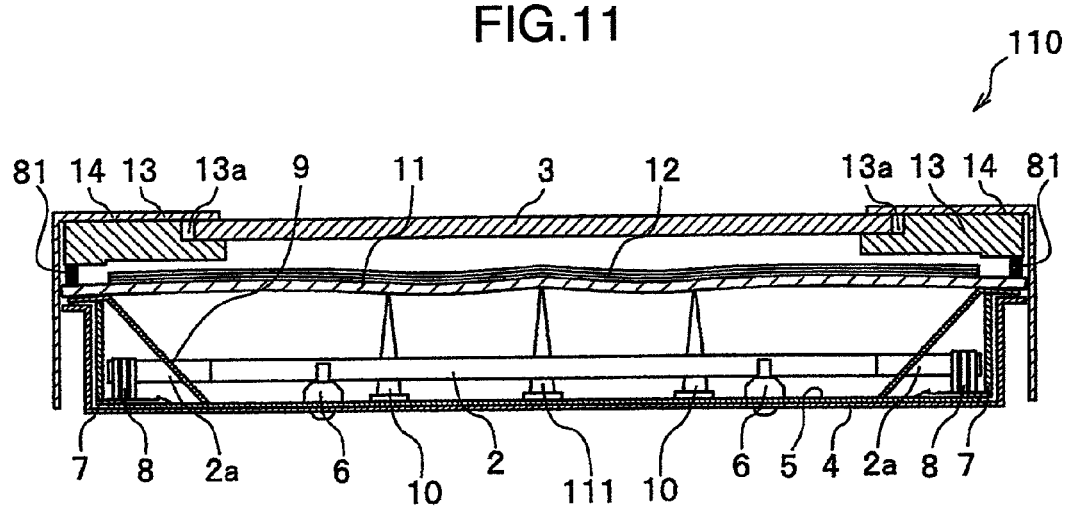
FIG. 11 is a cross sectional view showing a structure of a liquid crystal display apparatus in accordance with a fourth embodiment of the present invention.

A description will be given below of a liquid crystal display apparatus in accordance with a fourth embodiment of the present invention with reference to FIG. 11. FIG. 11 is a cross sectional view showing a structure of the liquid crystal display apparatus in accordance with the fourth embodiment. Hereinafter, the liquid crystal display apparatus in accordance with the fourth embodiment will be called as a liquid crystal display apparatus 110 in accordance with the present embodiment.

First of all, a description will be given of a structure of the liquid crystal display apparatus 110 in accordance with the present embodiment. The liquid crystal display apparatus 110 in accordance with the present embodiment is structured such that the distance (the height) near the center portion of the diffusion plate 11 can be retained even at a time when the diffusion plate 11 is thermally deformed, by making the distance (the height) from the reflection sheet 5 to the diffusion plate 11 larger toward the center portion of the diffusion plate 11, such as the liquid crystal display apparatus 80 in accordance with the third embodiment. In other words, the structure is made such that the contact surface 9a of the upper side mold 9 with the diffusion plate 11 is inclined in the same manner as FIG. 9, one end of the diffusion plate pressing member 81 is fixed to the portion near the end portion of the diffusion plate 11, and the other end is fixed to the portion near the end portion of the intermediate frame 13. Further, the structure is made such as to be provided with a pin mold 111 supporting the portion near the center of the diffusion plate 11, and arrange the pin mold 111 such that a height of the pin mold 111 is slightly higher than a height from the reflection sheet 5 to the contact surface 9a of the upper side mold 9 with the diffusion plate 11. Specifically, the structure is made such as to arrange the pin mold 111 such that the height of the pin mold 111 is larger only at 0.1 to 1.0 mm than the height of the pin mold 10 in the peripheral portion.

In accordance with the structure, since it is possible to maintain at least the portion near the center of the display screen (the liquid crystal panel 3) having the highest sensitivity of the viewer with respect to the brightness unevenness equal to or more than the minimum diffusion distance, it is possible to provide the good image in which the brightness unevenness is suppressed, in the liquid crystal display apparatus 110 in accordance with the present embodiment. Further, since the diffusion plate pressing member 81 presses the diffusion plate 11 and the pin mold 111 having the somewhat larger height than the pin mold 10 of the peripheral portion supports the portion near the center of the diffusion plate 11, even if the diffusion plate 11 is heated by the light generation of the fluorescent portion 2, it is possible to prevent the diffusion plate 11 from being thermally deformed so as to be deformed convex to the fluorescent tube 2 side. Particularly, since the pin mold 111 having the somewhat larger height than the pin mold 10 in the peripheral portion supports the portion near the center of the diffusion plate 11, the force blocking the thermal deformation of the diffusion plate 11 becomes larger in the liquid crystal display apparatus 110 in accordance with the present embodiment than the liquid crystal display apparatus in accordance with the third embodiment.

As a result, even in the case that an unexpected mechanical stress strain is generated by an application of an external force or the like, it is possible to suppress the fluctuation of the diffusion distance to the minimum. Accordingly, in the liquid crystal display apparatus 110 in accordance with the present embodiment, it is possible to maintain an extremely good display quality having no brightness unevenness.

In this case, if the pin mold 111 is made excessively high, the diffusion distance is not fixed, the diffusion resistance becomes larger near the center of the diffusion plate 11, and the diffusion distance becomes small near the end portion of the diffusion plate 11. Accordingly, in the liquid crystal display apparatus 110 in accordance with the present embodiment, the height of the pin mold 111 is made higher at about 0.1 to 1.0 mm than the height of the pin mold 10 in the peripheral portion.

In general, since the strain caused by the heat of the diffusion plate 11 is enlarged in accordance that the area of the liquid crystal panel 3 is larger, a difference in height is necessary in the case that the portion having no pin mold 10 is thermally deformed so as to be deformed convex toward the fluorescent tube 2 side, due to a stress strain existing interlay in the diffusion plate 11, however, since a value of the strain is changed on the basis of a coefficient of thermal expansion of a raw material of the diffusion plate 11, a thickness of the substrate, and a magnitude of the internally existing stress strain, it is impossible to definitely determine. However, in the case of a high heat resisting resin such as a meta acrylic resin or a cycloolefin polymer resin used in the diffusion plate 11, it is possible to obtain a good result by the difference in height at about 1.0 mm to the maximum.

CONCLUSION

As mentioned above, in the liquid crystal display apparatuses in accordance with the first to fourth embodiments, since it is possible to prevent the thermal deformation of the diffusion plate even if the diffusion plate is heated by the light generation of the fluorescent tube, it is possible to provide a good image in which the brightness unevenness is suppressed.

Figure 12:
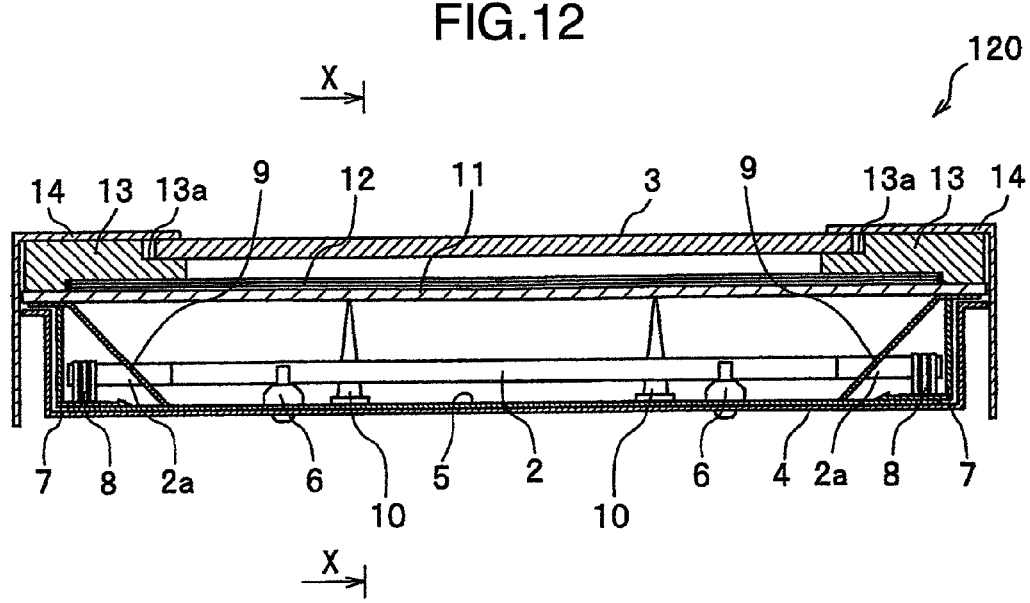
FIG. 12 is a cross sectional view in a longitudinal direction showing a structure of a liquid crystal display apparatus which does not have a mold pin supporting a portion near a center of a diffusion plate, and a diffusion plate pressing member in which one end is fixed to a portion near an end portion of the diffusion plate and the other end is fixed to a portion near an end portion of an intermediate frame.
Figure 13:
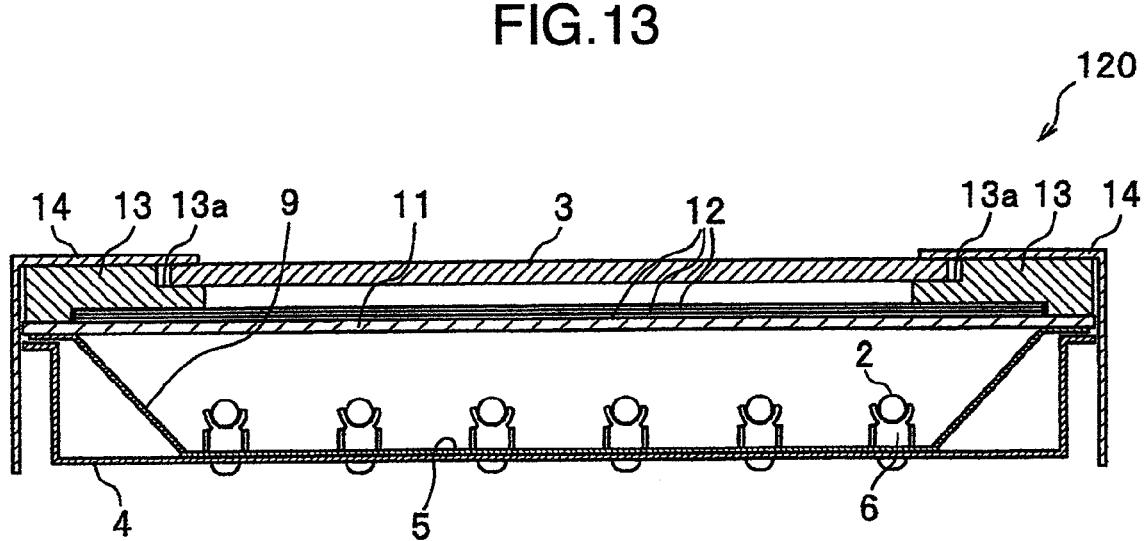
FIG. 13 is a cross sectional view (a cross sectional view along a line X-X) in a short direction showing the structure of the liquid crystal display apparatus which does not have the mold pin supporting the portion near the center of the diffusion plate, and the diffusion plate pressing member in which one end is fixed to the portion near the end portion of the diffusion plate and the other end is fixed to the portion near the end portion of the intermediate frame.

On the other hand, as a comparative example, in a liquid crystal display apparatus 120 which does not have the mold pin 10a supporting the portion near the center of the diffusion plate 11, and the diffusion plate pressing member 81 in which one end is fixed to the portion near the end portion of the diffusion plate 11, and the other end is fixed to the portion near the end portion of the intermediate frame 13, as shown in FIGS. 12 and 13, since it is impossible to prevent the thermal deformation of the diffusion plate 11 by the light generation of the fluorescent tube 2, there is generated a problem that the light generating portion of the fluorescent tube is viewed as the brightness unevenness, in the case of achieving the thin type liquid crystal display apparatus having a short diffusion distance. FIGS. 12 and 13 are respectively a cross sectional view in a longitudinal direction and a cross sectional view in a short direction (a cross sectional view along a line X-X) showing a structure of a liquid crystal display apparatus which does not have the mold pin 10a supporting the portion near the center of the diffusion plate 11, and the diffusion plate pressing member 81 in which one end is fixed to the portion near the end portion of the diffusion plate 11, and the other end is fixed to the portion near the end portion of the intermediate frame 13.

In this case, if the diffusion plate of the liquid crystal display apparatus in accordance with the first to fourth embodiments mentioned above is constituted by a diffusion plate with a prism shape, it is possible to obtain a further high brightness uniformity even in the case that the diffusion distance is short (for example, 10 mm or less), by reflecting the white light from the fluorescent tube at a fixed rate in correspondence to an angle of incidence by the diffusion plate with the prism shape so as to input to the reflection sheet and the fluorescent tube in the downward side, and reentering as the diffusion light to the diffusion plate with the prism shape, because the prism has a recursive effect. Accordingly, it is possible to maintain an extremely good display quality. Particularly, in the case that the diffusion distance is short and the tube distance is equal to or less than threefold the diameter of the fluorescent tube, the structure is effective.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising:
a liquid crystal panel displaying an image;
a lighting apparatus arranged in a back face of said liquid crystal panel and emitting a light to said liquid crystal panel;
said lighting apparatus having at least one linear light source, a reflection member reflecting the light from said linear light source in a diffusion manner, and a diffusion transmitting member transmitting the light from said linear light source in a diffusion manner; and
a plurality of first support members fixed in the vicinity of end portions of said reflection member and supporting said diffusion transmitting member;
wherein a liquid crystal panel insertion member is provided, said liquid crystal panel insertion member having a groove at an inner side in which said liquid crystal panel is inserted;
wherein at least one second support member is fixed to said reflection member in such a manner as to support a portion near a center of said diffusion transmitting member;
wherein a third support member is provided at a position so as to approximately equally divide a distance between said at least one second support member and an end of a lower frame of said lighting apparatus and to support a position on said diffusion transmitting member, said third support member being fixed to said reflection member; and
wherein a diffusion plate pressing member is provided so that one end thereof is fixed to an end portion of said diffusion transmitting member and an other end thereof is fixed to an end portion of said liquid crystal panel insertion member.

2. A liquid crystal display apparatus as claimed in claim 1, wherein said at least one second support member has a height which is larger than a height of said plurality of first support members and is fixed to said reflection member, in such a manner as to support the portion near the center of said diffusion transmitting member.

3. A liquid crystal display apparatus as claimed in claim 2, wherein a difference of height between said plurality of first support members and said at least one second support member is between 0.1 and 1.0 mm.

4. A liquid crystal display apparatus as claimed in claim 1, wherein said diffusion transmitting member is constituted by a diffusion plate with a prism shape.

5. A liquid crystal display apparatus as claimed in claim 4, wherein a distance between said linear light source and said diffusion transmitting member is equal to or less than threefold a diameter of said linear light source.

6. A liquid crystal display apparatus as claimed in claim 1, wherein an incline or a step is provided at a contact surface between said diffusion transmitting member and said end of said lower frame of said lighting apparatus, said incline or step extending in a downward direction away from said diffusion transmitting member and away from said end of said lower frame of said lighting apparatus.

7. A liquid crystal display apparatus as claimed in claim 1, wherein a plurality of said at least one second support member are provided and arranged in a line so as to support a plurality of points on a center line extending in a short dimension of said diffusion transmitting member.

* * * * *